United States Patent [19]

Gawrisch

[11] Patent Number: 4,684,487
[45] Date of Patent: Aug. 4, 1987

[54] PROCESS FOR THE CONTROL OF PROCESS PARAMETERS IN THE PRODUCTION OF STRETCHED FOILS

[75] Inventor: Wolfgang Gawrisch, Gau-Bischofsheim, Fed. Rep. of Germany

[73] Assignee: Hoechst Aktiengesellschaft, Frankfurt am Main, Fed. Rep. of Germany

[21] Appl. No.: 764,675

[22] Filed: Aug. 12, 1985

[30] Foreign Application Priority Data

Aug. 18, 1984 [DE] Fed. Rep. of Germany ....... 3430439

[51] Int. Cl.[4] .............................................. B29C 55/12
[52] U.S. Cl. ..................................... 264/22; 264/40.2; 264/40.7; 264/235.6; 264/235.8; 264/288.4; 264/290.2; 356/364
[58] Field of Search ...................... 264/1.3, 40.2, 40.7, 264/235.6, 235.8, 288.4, 290.2, 22; 356/364, 365, 367

[56] References Cited

U.S. PATENT DOCUMENTS

| | | | |
|---|---|---|---|
| 2,474,906 | 7/1949 | Meloon | 356/365 |
| 3,177,277 | 4/1965 | Adams et al. | 264/235.8 |
| 3,394,429 | 7/1968 | Nakagawa et al. | 264/288.4 |
| 3,941,482 | 3/1976 | Schneider | 356/365 |
| 3,974,248 | 8/1976 | Atkinson | 264/40.2 |
| 3,992,571 | 11/1976 | Garlick et al. | 356/365 |
| 4,409,160 | 10/1983 | Kogo et al. | 264/290.2 |
| 4,440,699 | 4/1984 | Smid et al. | 264/40.2 |

FOREIGN PATENT DOCUMENTS

| | | | |
|---|---|---|---|
| 2804975 | 8/1979 | Fed. Rep. of Germany | 356/364 |
| 3001881 | 8/1981 | Fed. Rep. of Germany | |
| 3243719 | 5/1984 | Fed. Rep. of Germany | |
| 47070 | 4/1977 | Japan | 264/288.4 |
| 104743 | 8/1980 | Japan | 356/364 |
| 2052049 | 1/1981 | United Kingdom | 356/364 |

Primary Examiner—James Lowe
Attorney, Agent, or Firm—Schwartz, Jeffery, Schwaab, Mack, Blumenthal & Evans

[57] ABSTRACT

Disclosed is a method for optically generating a scatter pattern of a biaxially stretched foil web at at least two positions of the foil web in the longitudinal and/or transverse direction. The scatter pattern is, in particular, rotated by transverse stretching in relation to a principal orientation direction. This rotation causes a change of the optical anisotropy condition of the foil web. The magnitude of the rotation is measured and utilized for the regulation of the temperature of a temperature field for the thermal fixing of the foil web, the orientation condition of the molecule chains in the foil web being made uniform as a result of the regulation of the temperature field. In order to generate the scatter pattern, a light source and at least one polarizer are disposed on one side of the foil web and an analyzer is disposed on the other side of the foil web. The light beam from the light source is polarized by the polarizer and oscillates in a specific plane of oscillation. The scatter pattern is produced by scattering at the molecule chains of the foil web. Behind the analyzer is situated a light-sensitive element, for example, a photocell or a video camera, which is connected to a computer for the evaluation of the contrast values of the scatter pattern.

11 Claims, 12 Drawing Figures

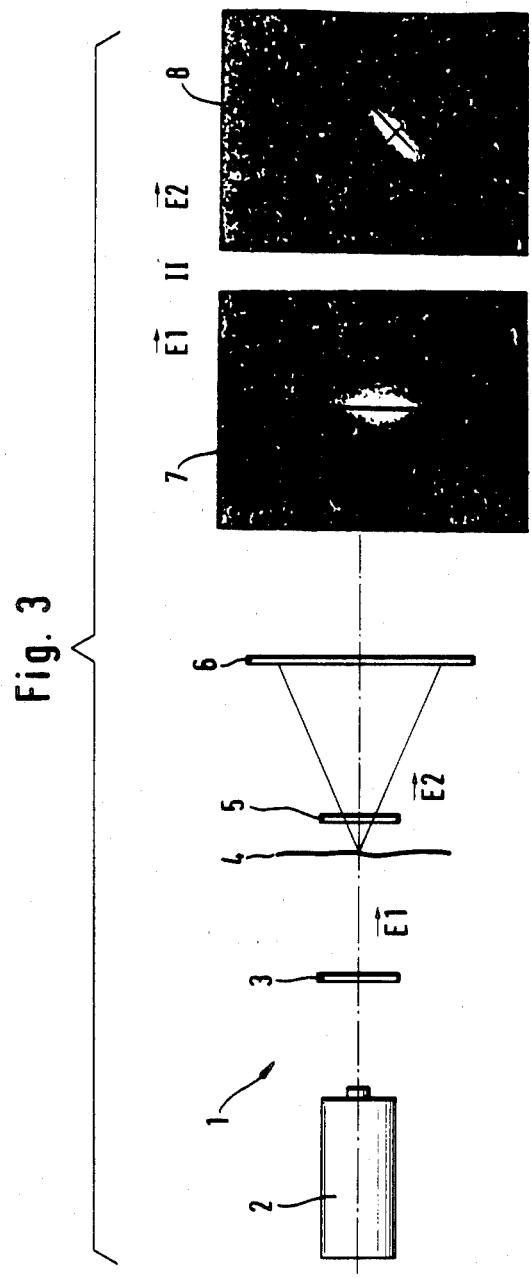

PROCESS FOR THE CONTROL OF PROCESS PARAMETERS IN THE PRODUCTION OF STRETCHED FOILS

BACKGROUND OF THE INVENTION

The present invention relates to a process for controlling process parameters in the production of stretched foils in order to make the orientation condition of molecule chains in the foils uniform. The present invention also relates to an apparatus for carrying out the process.

In the production of films from thermoplastic materials, the polymer granulate is formed into a molten film by means of an extruder and a flat-sheet die. The molten film hardens on contact with cooling rollers to produce an intial film, which is then stretched, either simultaneously or in stages, by means of stretching devices. This results in an orientation of the molecule chains in the foil material, which is essentially created by the stretching process. Usually, longitudinal stretching in the machine direction takes place in the first instance. Subsequently, lateral stretching takes place in the cross direction or the direction transverse to the machine direction. The lateral stretching is, in general, carried out in a frame. After completion of the lateral stretching, the foil band is subjected to a temperature treatment, which results in thermal fixing of the orientation of the molecule chains in the foil, thus maintaining the form of the foil material. As a result of the stretching, a partially crystalline and biaxially oriented foil is produced. The orientation within the foil can be described by the index ellipsoid, which is set by the refractive indices n1, n2 and n3. Depending upon the existing orientations of the molecule chains in the foil, different refractive indices exist in three mutually perpendicular axial directions.

From German Offenlegungsschrift No. 3,001,881, a process is known for the analysis of the surface quality of flexible materials, more particularly of foil webs. According to the process, the surface quality is analyzed by interference fringes which are produced by means of a light beam which is directed obliquely onto the surface of a test object to be investigated. Part of the light beam is reflected at the surface and another part is reflected at a reference surface. By superposition of the two partial beams, an interference field is created, which is equivalent to the test object surface profile set against the reference surface. The interference field is evaluated in order to determine the spread of the surface profile in its length and height with reference to the spacings of the interference lines and the wavelength of the incident light. The test object to be investigated is set on the reference surface under predetermined tensile stress. The light beam directed onto the surface to be investigated is monochromatic. By this process, unevenness in the surface of foil webs can easily be detected, it being possible to determine the height of each unevenness by counting the number of interference rings.

In German Offenlegungsschrift No. 3,243,719, a laser-optic arrangement is described for the production of scattered light, shadow, or reflection signals from individual particles which flow in a flow cell and which are registered by a photodetector by means of an appropriate optical imaging system as temporal tension/current fluctuations. According to the laser-optic arrangement, the temporally fluctuating scattered light signals of flowing particles and/or particle aggregates are detected and evaluated. This makes it possible to carry out a significant determination of the degree of dispersion in systems, corrected for practical conditions, within measurement times smaller than 5 seconds, and to use same as a standard to increase the performance of dispersing or flocculating systems.

In biaxially oriented foils, it is generally the case that—depending upon the process parameters—different orientation conditions of the molecule chains exist in the longitudinal and transverse direction. In particular, in biaxially stretched polyester foils, conditions of optical anisotropy are observed in the longitudinal and transverse direction. These differing conditions are caused by a deviation of the principal orientation direction of the molecule chains in dependence upon the foil width. Thus, for example, in the transverse direction of the foil, the parts at the edge of the foil exhibit different orientation conditions from the center of the foil. The deviation in dependence upon the foil width is designated as BOWING or a BOW effect, which—related to the foil width—causes the range of physical properties of the foil to be nonhomogeneous, which can, in some cases, be associated with a reduced mechanical quality of the foil.

SUMMARY OF THE INVENTION

It is therefore an object of the present invention to provide a process for the production of foil webs of uniform quality in both the longitudinal and transverse directions of the biaxially stretched foils.

A further object of the present invention is to provide for the analysis of the orientation condition of the molecule chains in relation to a principal or preferred direction.

Another object of the invention is to provide a temperature field whereby the temperature of the field can be modified to adjust the stretched characteristics of the web.

Still another object of the invention is to provide an apparatus for monitoring the molecular chain properties of a stretched foil web and adjusting the processing properties, e.g., web speed and fixing temperature, to preferred values.

In accomplishing the foregoing objects, there has been provided in accordance with one aspect of the present invention, a process for the production of a stretched foil having uniform orientation conditions in the molecular chains of the foil, comprising the steps of optically generating a scatter pattern of a stretched foil web at least two measurement positions in at least one of the longitudinal and transverse directions of said web; measuring the rotation of said scatter pattern in relation to a preferred direction, said rotation of said scatter pattern being determined as a measure of the change in the uniform orientation conditions of the stretched foil web; and utilizing said measured rotation to regulate the temperature of a temperature field for thermally fixing said foil web in such a manner that an anisotropy condition of the stretched foil web is changed into an isotropy condition with uniform orientation conditions in the molecular chains of the foil in said preferred direction.

In another embodiment there has been provided a process for the production of a stretched foil having uniform orientation conditions in the molecular chains of the foil, comprising the steps of stretching a foil web in at least one direction and fixing the stretched web, the stretching and fixing steps being performed in three temperature zones which include a stretching temperature zone, a neutral temperature zone and a fixing temperature zone, emitting a beam of light from a light source and passing the light beam through a polarizer, impinging the light beam on the stretched foil web, the molecules or molecular chain of the web scattering the light, passing the scattered light through an analyzer, the analyzer producing a scatter pattern of the scattered light, measuring the scatter pattern and comparing the measured scatter pattern to a predetermined value, and adjusting the temperature of the neutral temperature zone based on the compared scatter pattern, wherein the temperature of said neutral temperature zone is adjusted to obtain isotropy conditions with uniform orientation conditions in said molecules or said molecular chains of said foil in a preferred direction.

The production of the scatter pattern, the determination of the rotation of the scatter pattern and the regulation of the temperature of the temperature field take place while production of the foil web is in progress, i.e., the process permits on-line monitoring and control of the quality of the biaxially stretched foil web.

The process is expediently designed so that monochromatic polarized light passes through the foil web and is scattered thereby and that the electric field strength vector of the light oscillates in a plane parallel to the plane of oscillation of an analyzer. Thereafter, the intensity of the light emerging from the analyzer is measured. In a modified process, the analyzer provides a scatter pattern which is recorded as a raster pattern by a video camera. The contrast of the raster pattern is arithmetically evaluated in order to determine the lines of equal intensity. Expediently, the foil web is irradiated with monochromatic polarized light, which is scattered at the molecule chains. Furthermore, the electric field strength vector of the light oscillates in a plane perpendicular to the plane of oscillation of an analyzer, and the intensity of the light emerging from the analyzer is measured. The scatter pattern of the foil web can furthermore be produced with white light.

In accordance with another aspect of the present invention, there has been provided an apparatus for producing a stretched foil having uniform orientation conditions in the molecular chains of the foil, comprising a light source, an optical imaging system comprising a polarizer and an analyzer for irradiating a foil web and generating a scatter pattern of the foil web, a light-sensitive element for determining the intensity of light passing through the foil web and for measuring the scatter pattern, and a monitoring and comparing means connected to the light-sensitive element for evaluating the contrast values of the scatter pattern, wherein the light source and the polarizer are positioned on one side of the foil web and the analyzer and the light-sensitive element are positioned on the opposite side of the foil web.

In another embodiment of the apparatus, the polarizer and the analyzer are polarizing prisms of birefringent crystals. Furthermore, dichroic foils designed as polarizing filters can be provided. The light-sensitive element is preferably a photocell, with which the location of maximum brightness of the scatter pattern is determined. In another embodiment of the apparatus, the light-sensitive element is a video camera which provides a raster pattern as scatter pattern. A computer then determines lines of equal intensity, and thus the contour, by means of an evaluation of the contrast of the raster pattern.

With the present process and apparatus for carrying out the process, advantages are achieved in that the orientation condition of biaxially stretched foils can be analyzed while the production process is in progress. The analysis is performed in such a manner that any rotation of the principal orientation direction of the molecules or molecule chains, relative to a preferred direction, causes a rotation of the scatter pattern. The rotation is measured, arithmetically evaluated, and utilized as a standard for the control of process parameters, such as for example, the temperature. Because the measured values relating to the orientations of the molecule chains are utilized for process control, it is possible to achieve uniformity of the orientations of the molecule chains. It is also possible to achieve such uniformity because the change in the anisotropy condition of the foils is determined by reference to the rotation of the generated scatter pattern by indicating the location of maximum brightness with the aid of light-sensitive components such as a photocell or video camera.

Further objects, features and advantages will become apparent from the detailed description of preferred embodiments which follows, when considered in light of the attached figures of drawing.

BRIEF DESCRIPTION OF THE DRAWINGS

In the following, the process according to the invention is explained in greater detail with reference to an exemplary embodiment of the apparatus. What is shown is the following:

FIG. 3 schematically illustrates an apparatus according to the present invention for the determination of the scatter pattern of polyethylene terephthalate (PET) foils;

DETAILED DESCRIPTION OF THE PREFERRED EMBODIMENTS

Figure 1B:
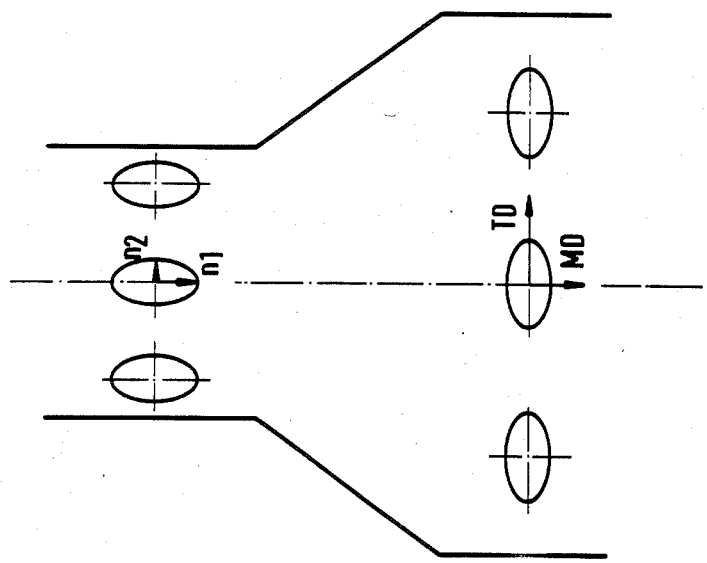
FIGS. 1a and 1b schematically depict the optical anisotropy and the ideal anisotropy condition of a uniaxially and a biaxially oriented foil.

According to the invention, a scatter pattern is optically produced of a biaxially stretched foil web at at least two measurement positions of the foil web in the longitudinal and/or transverse direction. The rotation of the scatter pattern in relation to a preferred direction is determined as a measure of the change in the anisotropy condition of the stretched foil web and is utilized to regulate the temperature of a temperature field for the thermal fixing of the foil web.

The apparatus for carrying out the process according to the invention comprises a light source, an optical imaging system for irradiating the foil web and for generating a scatter pattern of the web, and a light-sensitive element for determining the intensity of the light passing through the foil web. The light source and a polarizer of the optical imaging system are disposed on one side of the foil web, and an analyzer of the optical imaging system and the light sensitive element are disposed on the other side of the foil web. The light-sensitive element is connected to a computer to evaluate the contrast values of the scatter pattern.

The anisotropy condition which occurs in practice and the desired ideal anisotropy condition of a uniaxially and biaxially stretched foil web will be explained with reference to FIGS. 1a and 1b. As FIG. 1a illustrates, it is generally the case that—as determined by the process parameters—different orientation conditions exist in the longitudinal or machine direction (MD direction) and the transverse direction (TD direction). The index ellipses represented in FIGS. 1a and 1b reproduce a cross-section in the foil web through the so-called index ellipsoid, which is set by the different refractive indices n1, n2 and n3 in the three mutually perpendicular directions in space.

After the longitudinal stretching, the three index ellipses shown lie with their minor axes substantially on a portion of the circumference of a circle with the radius $R_M$ and their major axes extend in the direction of the radii $R_M$. The major axis of the index ellipse lying centrally in the foil web coincides with the MD direction, which forms the principal orientation direction, while the major axes of the index ellipses situated to the left and to the right thereof coincide with the directions of the radii $R_M$ and form an angle $\psi$ with the principal orientation direction, which is greater the further the individual index ellipse is from the center of the foil web.

After the transverse stretching, the index ellipses are so oriented that their major axes lie approximately on a portion of the circumference of a circle with the radius $R_T$ or tangentially to this circumference of a circle, while the minor axes are aligned in the direction of the radii $R_T$. In the center of the foil web, the direction of the minor axis coincides with the principal orientation direction, while the minor axes of the index ellipses situated to the left and to the right of the center deviate from the principal orientation direction by an angle $\psi$, which is greater, the nearer the index ellipse is to the edge of the foil web.

The different orientations of the axes and their deviation from the principal orientation direction respectively result from the processing of the foil web. The longitudinal stretching of the heated foil web is carried out by means of stretching devices, for example, two rollers, over which the foil web is guided and which run at different speeds. In this procedure, the tension exerted by the rollers is not entirely uniform over the width of the foil web, but is greatest at the center, so that the result is the orientation of the index ellipses according to FIG. 1a. The transverse stretching process takes place in a so-called frame in which gripping devices, for example, clamps, which run at the same speed as the foil web, grip both edges of the foil web and move outwardly a certain amount transversely to the machine direction and subsequently run through the transverse stretching zone in the machine direction. In the transverse stretching zone the foil web is generally heated to about 80° C. to 100° C. and passes, prior to release from the gripping devices, through a thermal fixing field at a temperature of about 180° C., which stabilizes and fixes the orientation of the molecule chains in the foil web after the stretching processes, and thus makes the form of the foil web stable. During the transverse stretching, a greater tension is generally applied to the edges than to the center of the foil web, so that the result is the orientation of the index ellipses as shown in FIG. 1a. The deviation—observed after the transverse stretching process, for example, in the case of the production of polyester foils—of the molecule chains from the principal orientation direction as a function of the foil width is designated as an optical anisotropy condition, BOWING or a BOW effect.

Particularly in the case of highly oriented foils, this BOW effect generates an anisotropy of the mechanical properties, which has a negative effect on the quality of the foil and thus on the economic value of the foil product.

Figure 1A:
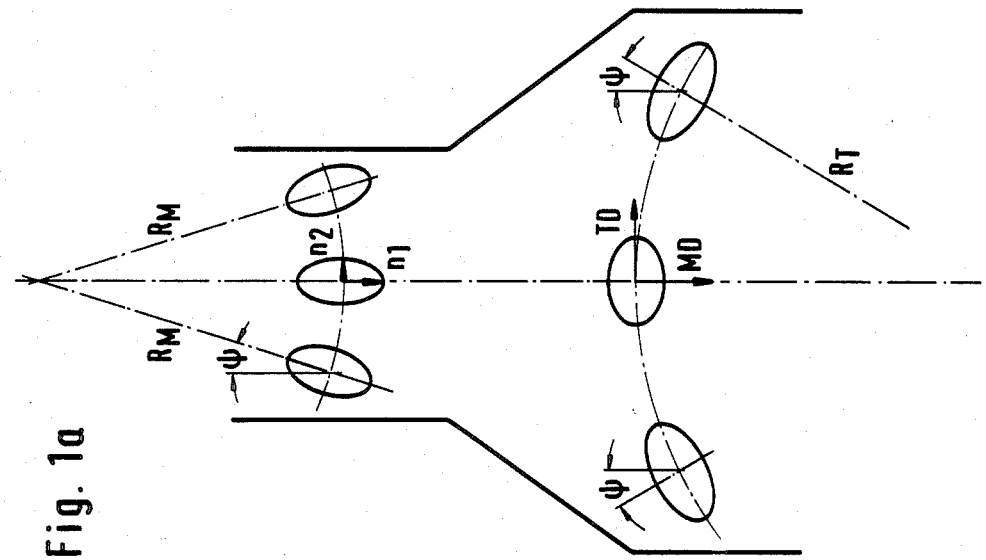

FIG. 1b shows the desired ideal anisotropy condition of a uniaxially and/or biaxially oriented foil web, in which all index ellipses both after the longitudinal stretching, and also after the transverse stretching, exhibit no deviations of their major or minor axes from the principal orientation direction. Furthermore, the molecule chains in the foil web also do not deviate from the principal orientation direction.

Figure 2A:
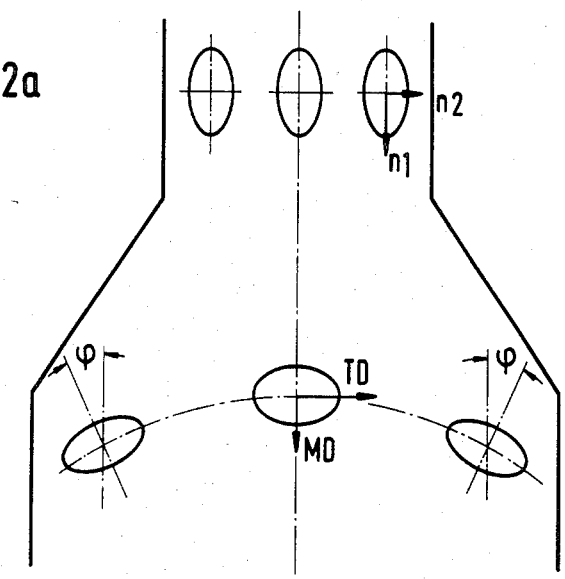
FIGS. 2a and 2d schematically depict the orientation of the molecule chains in uniaxially and biaxially stretched foils, as well as diagrams of the optical and mechanical properties as a function of the foil width as well as the rotation of the orientation direction of the molecule chains.
Figure 2B:
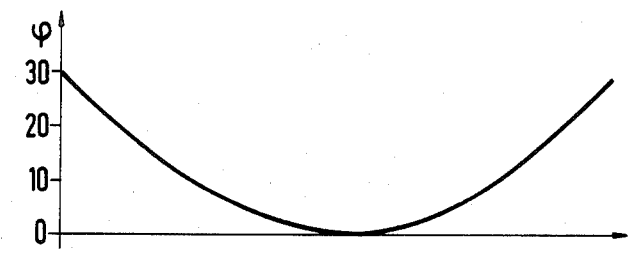
Figure 2C:
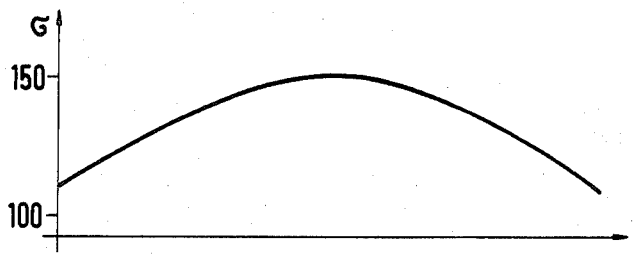
Figure 2D:
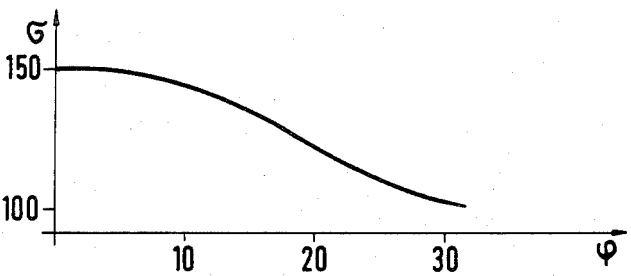

As shown in FIG. 2a, the minor axes of the index ellipses of a biaxially oriented foil web form angles $\phi$ with the principal orientation direction, the angles $\phi$ having the same meaning as the angles $\psi$ in FIG. 1a. In FIG. 2b, starting from the center of the foil web and extending in each instance to the left and to the right of the center, a specific position of the foil web is plotted on the abscissa axis and the corresponding angle $\phi$ of the deviation is plotted on the ordinate axis. The deviation from the principal orientation direction affects the optical properties, i.e., the refractive indices of the foil web. The optical properties possess the correlation shown in FIG. 2c with mechanical properties of the foil web, for example, with the tensile strength $\sigma$, which has been plotted over the width of the foil web. Starting from the center of the foil web with the maximum tensile strength $\sigma$, the latter diminishes towards the edges of the foil web. FIGS. 2b and 2c result in FIG. 2d, if in place of the width of the foil web the angle $\psi$ is plotted on the abscissa axis and the tensile strength $\sigma$ is plotted on the ordinate axis. It is evident from the diagram of FIG. 2d that with increasing deviation from the principal orientation direction, expressed by the angle $\phi$, the tensile strength $\sigma$ diminishes, i.e., the quality of the foil deteriorates.

It is evident that, on the basis of the determination of the optical anisotropy condition of the foil web, a statement can be made concerning the quality of the foil web.

With reference to FIG. 3, the basic construction of an apparatus 1 for the analysis of light scatter patterns 7 and 8 for the determination of the optical anisotropy condition of a moving foil web 4 will be described.

The beam from a light source 2, for example a laser or a conventional polychromatic or white light source, passes through a polarizer 3 and impinges on the moving foil web 4 to be examined. The beam is scattered at the molecules or molecule chains of the foil web. As soon as the light beam impinges the foil web, a secondary wave proceeds from each molecule or each molecule chain. This secondary wave has a characteristic direction distribution as a function of the size and of the optical quality of the molecule. Light scattering is quite generally understood to refer to the production of secondary light waves when a primary light wave impinges material. An analyzer 5, which is disposed in the direction of the light beam behind the foil web 4, has a plane of oscillation parallel to the plane of oscillation of the electric field vector →E1 before the foil web 4. After the scattering at the foil web 4, →E2 designates the electric field vector of the light beam emerging from the foil web 4. A so-called Vv scatter pattern 7 is produced by the analyzer 5 on a ground-glass plate 6. If transverse stretching of the foil web 4 takes place, as has been described with reference to FIGS. 1a and 2a, then the orientation of the molecules in the foil web 4 rotates relative to the principal orientation direction, and thereby causes a rotation of the Vv scatter pattern 7 into the position identified by the numeral 8. Polarizing prisms, which are known per se, of birefringent crystals are used as polarizer 3 and analyzer 5. Preferably, the polarizer 3 and the analyzer 5 comprise polarizing filters which include dichroic foils of cellulose hydrate or polyvinyl alcohol, which are made dichroic by dyes. The dichroism can be displaced into the respectively desired spectral range by a suitable choice of dye.

Figure 4:
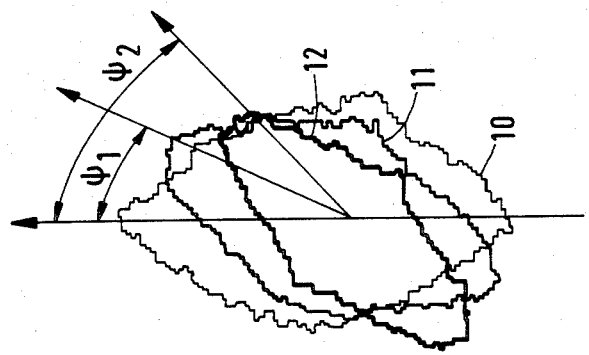
FIG. 4 illustrates scatter pattern—recorded with a video camera—in the form of raster patterns, which are rotated in relation to a principal orientation direction.

The evaluation of the rotation of the Vv scatter pattern 7 into the position of the Vv scatter pattern 8 can take place with the aid of a light-sensitive element, for example, a photocell or a video camera, which, respectively, take the place of the ground-glass plate 6 in the arrangement 1. As is schematically shown in FIG. 4, a video camera provides scatter patterns 10, 11 and 12 of a biaxially stretched foil web. The scatter pattern 10 is obtained if the light beam passes through the foil web at the center, while the scatter patterns 11 and 12 are rotated in relation to the principal orientation direction through the angles $\psi$ 1 and $\psi$ 2 respectively, i.e., the scatter patterns are provided by positions on the foil web which are situated between the central line and one edge of the foil web. The scatter patterns 10, 11 and 12, or raster patterns, are obtained by evaluating the contrast of the images of the video camera. The contours of the individual raster patterns establish the lines of equal light intensity and are determined by means of a computer, as will be explained below with reference to FIG. 6.

Figure 5:
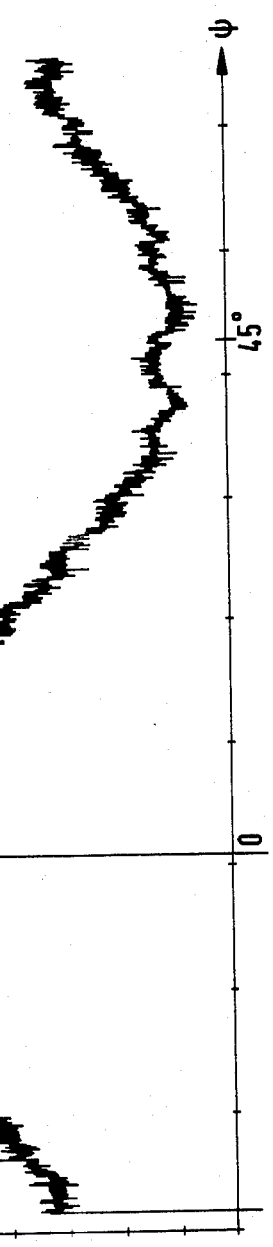
FIG. 5 presents a diagram of the light intensity of a scatter pattern which is measured by a photocell, as a function of the rotation of the scatter pattern in relation to a principal orientation direction.

FIG. 5 illustrates the light intensity Ia, measured by a photocell, which passes through a biaxially oriented foil web, over the angle $\psi$ of rotation of the scatter pattern relative to a principal orientation direction. The principal orientation direction of the foil web is, in the first instance, determined by the indication of the location of maximum brightness, i.e., of the greatest intensity Ia. This takes place in such a manner that the light beam from the light source passes normally through the center of the foil web. The entrance aperture of the photocell is disposed in the same plane as the light beam, normal to the foil web. By means of appropriate deflecting arrangements, the light beam is then directed to a position on the foil web which lies between the center and one edge. The light intensity of the light beam passes through the foil web at this position and is measured with the aid of the photocell, which retains its original position. Due to the rotation of the molecules relative to the principal orientation direction, the last-measured intensity is smaller than the previously measured intensity Ia. The angle $\psi$, which is associated with this intensity in the diagram according to FIG. 5, indicates the rotation of the scatter pattern relative to the principal orientation direction. The determination of the angle of rotation of the principal axis can thus take place either on the basis of the intensity analysis of the brightness measured with a photocell or directly from the rotation of the raster pattern of a video camera.

A further possibility for the determination of the angle of rotation arises from a compensation method. According to the method, upon exceeding a theoretical value as a result of a measured rotation of the scatter pattern, the polarizer and the analyzer in the apparatus 1 according to FIG. 3 are rotated in the same direction by means of controlled setting motors until such time as the rotated scatter pattern coincides with the scatter pattern of the initial setting or the initial measurement. The optical anisotropy condition of the foil web is then directly determined from the rotation of the analyzer or polarizer required for the compensation between the original scatter pattern and the rotated scatter pattern.

Figure 6:
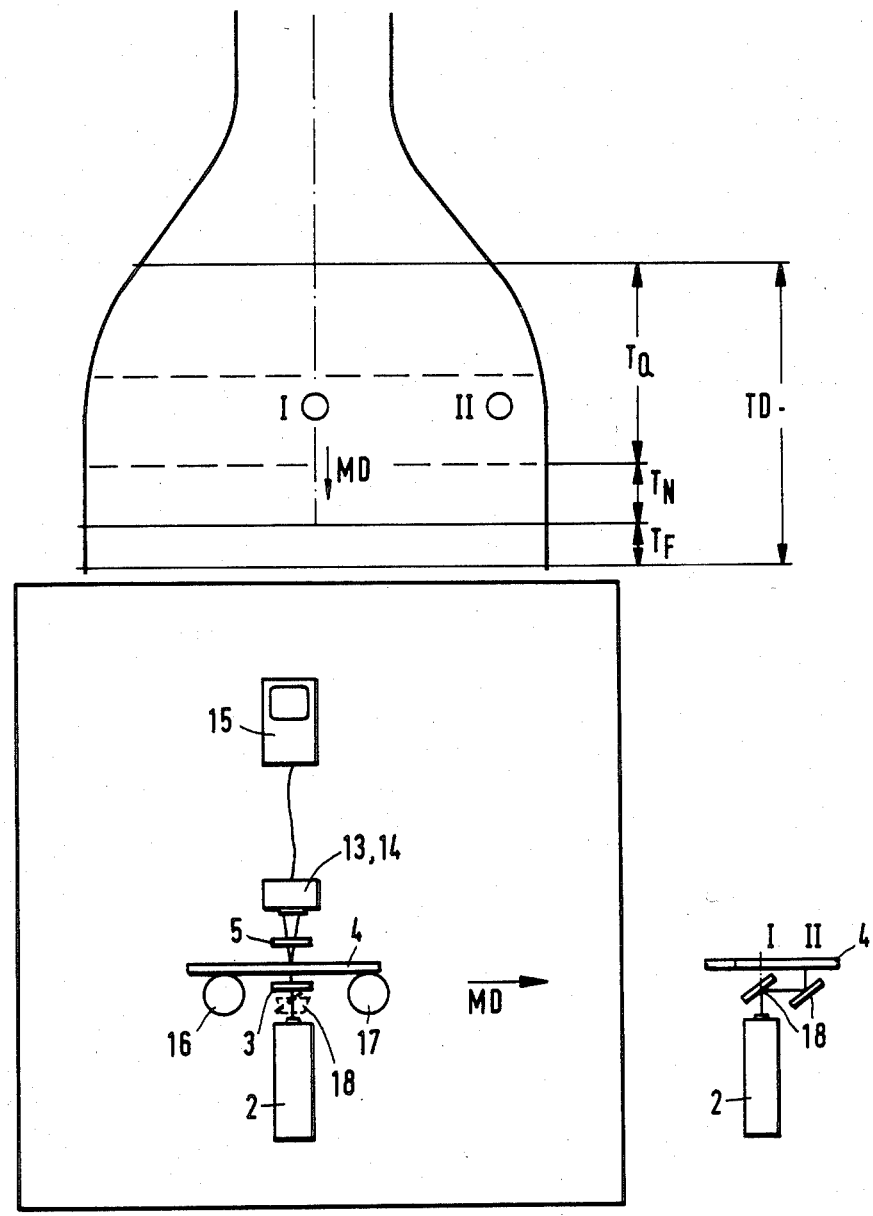
FIG. 6 is a schematic representation of an apparatus according to the present invention for the determination of the optical anisotropy of oriented polyethylene foils for the control of the on-line production process for foils.

The measured values which reflect the rotations of the scatter patterns relative to the principal orientation direction, are utilized in the production of foils by on-line operation in order to control the temperature field, as will be described with reference to FIG. 6. In the schematically represented biaxially stretched polyethylene foil web, two measurement positions I and II are indicated, which are traversed by a light beam from a light source below the foil web. Detectors 13 and 14, respectively, are disposed as light sensitive elements above the foil web 4, opposite the measurement positions. The reference numeral 13 designates a photocell and the reference numeral 14 a video camera. The transverse stretching zone or TD zone is, for example, subdivided into three temperature fields, a temperature field $T_Q$ for transverse stretching at a temperature of about 80° C. to 100° C., a neutral field $T_N$ of about 100° C. to 120° C., and a thermal fixing field $T_F$ of about 180° C. The polyethylene foil web 4 runs in the MD direction over rollers 16, 17 and is irradiated from below by the light source 2 in the positions I (center of foil) and II (edge of foil). If the light source 2 is a laser, which, as is known, emits a monochromatic radiation, the measurement beam can be directed via a mirror system 18, indicated in broken lines, to almost any selectable position of the foil web 4, and thus also from the position I into the position II, which in the arrangement according to FIG. 6 lies in a plane perpendicular to the plane of the paper.

Figure 7:
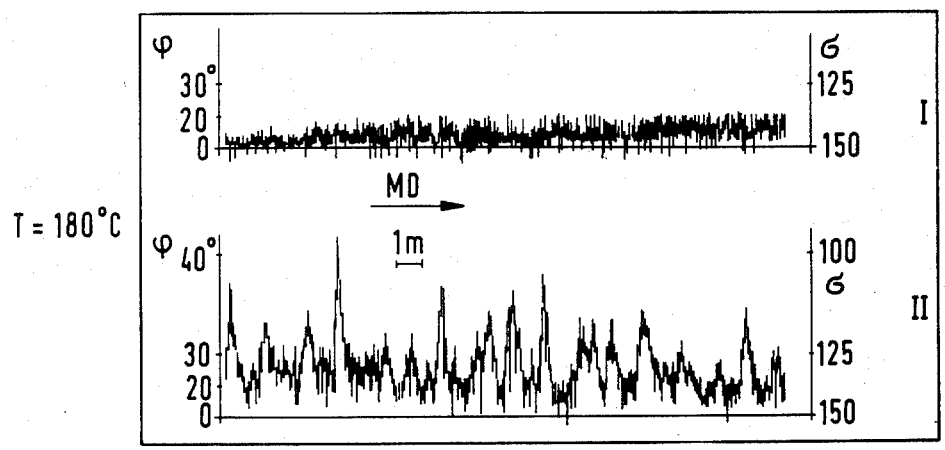
FIG. 7 presents a diagram of the optical anisotropy over the width of the foil after transverse stretching of the foil.

With a video camera 14 as light sensitive element, the video camera being connected to a computer 15 with printer, the measurement results shown in diagram form in FIG. 7 are obtained. These results show very great anisotropy fluctuations in position II at the edge of the foil web if the thermal fixing field $T_F$ in the transverse stretching zone is immediately adjacent the temperature field $T_Q$, i.e., a neutral field $T_N$ is not present. Fluctuations of the mechanical properties appear alongside the anisotropy fluctuations.

The measured scatter pattern in position II is compared to a predetermined value, for example, to the scatter pattern in position I, and the temperature of the neutral temperature field is adjusted, based on the predetermined scatter pattern in such a manner that the measured and the predetermined scatter patterns are similar in their fluctuations, so that the measured pattern exhibits also the same high degree of uniformity in its fluctuations as the predetermined scatter pattern.

Figure 8:
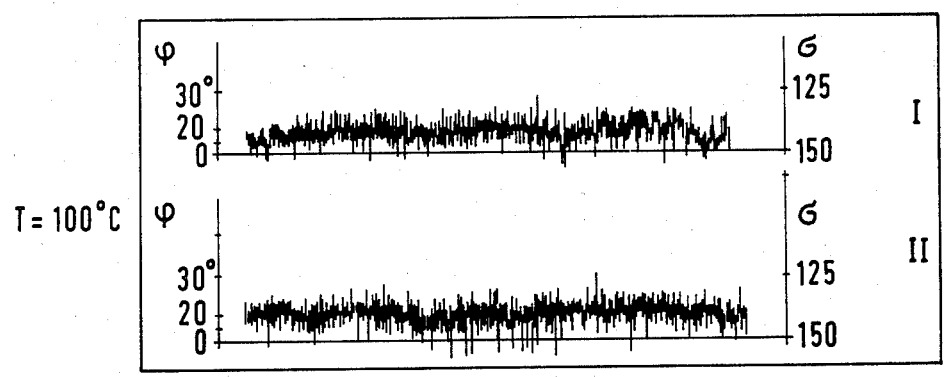
FIG. 8 presents a diagram of the optical anisotropy over the width of the foil after regulation of the temperature as a process parameter in the thermal fixing of the foil following the transverse stretching.

The measured values which correspond to the anisotropy fluctuations and which are measured at a frame temperature of approximately 180° C. are employed for the control of the transverse stretching and for the thermal fixing of the foil web in such a manner that the previously mentioned neutral field with a frame temperature of about 100° C. to 120° C. is operated as a temperature field between the temperature field $T_Q$ and the thermal fixing field $T_F$. The diagram in FIG. 8 shows the optical anisotropy condition which is then obtained in the region of position II, the region of the edge of the foil web, and which exhibits a very high degree of uniformity as compared with the anisotropy condition according to FIG. 7. The mechanical properties of the foil web are thus clearly improved.

The measured values corresponding to the anisotropy condition according to FIG. 7 can also be employed to control a further process parameter, namely the transport speed of the foil web in the transverse stretching zone and/or the longitudinal stretching zone. Likewise, it is also possible to simultaneously control both the neutral field $T_N$ and the transport speed of the foil web in the transverse stretching zone and/or the longitudinal stretching zone.

I claim:

1. A process for the production of a stretched foil web having uniform orientation conditions in the molecular chains of the foil, comprising the steps of:
   optically generating a scatter pattern of a stretched foil web at at least two measurement positions in at least one of the longitudinal and transverse directions of said web;
   measuring the rotation of said scatter pattern in relation to a preferred direction, said rotation of said scatter pattern being determined as a measure of the change in the uniform orientation conditions of the stretched foil web; and
   utilizing said measured rotation to regulate the temperature of a temperature field for thermally fixing said foil web in such a manner that an anisotropy condition of the stretched foil web is changed into an isotropy condition with uniform orientation conditions in the molecular chains of the foil in said preferred direction.

2. The process as defined in claim 1, wherein the process is performed continuously.

3. The process as defined in claim 1, wherein said optical generating step includes passing a monochromatic polarized light through said foil web, said polarized light being scattered by said foil web, wherein the electric field strength vector of said light oscillates in a plane parallel to the plane of oscillation of an analyzer.

4. The process as defined in claim 3, wherein said measuring step includes measuring said scattered light emerging from said analyzer.

5. The process as defined in claim 4, wherein said measuring step includes:
   recording the scatter pattern of said scattered light by means of a video camera, and
   arithmetically evaluating said scatter pattern to determine the lines of equal intensity.

6. A process as defined in claim 5, wherein said scatter pattern comprises a raster pattern.

7. A process as defined in claim 23, wherein said optical generating step includes passing a monochromatic polarized light through said foil web, said polarized light being scattered by said foil web, wherein the electric field strength vector of the light oscillates in a plane perpendicular to the plane of oscillation of an analyzer.

8. A process as defined in claim 7, wherein said measuring step includes measuring said scattered light emerging from said analyzer.

9. A process for the production of a stretched foil web having uniform orientation conditions in the molecular chains of the foil, comprising the steps of:
   stretching a foil web in at least one direction and fixing said stretched web, said stretching and fixing steps being performed in three temperature zones which include a stretching temperature zone, a neutral temperature zone, and a fixing temperature zone;
   emitting a beam of light from a light source and passing said light beam through a polarizer;
   impinging said light beam on said stretched foil web, the molecules or molecular chain of said web scattering said light;
   passing said scattered light through an analyzer, said analyzer producing a scatter pattern of said scattered light;
   measuring said scatter pattern and comparing said measured scatter pattern to a predetermined value; and
   adjusting the temperature of said neutral temperature zone based on the compared scatter pattern for thermally fixing said foil web in such a manner that an anisotropy condition of the stretched foil web is changed into an isotropy condition.

10. A process as defined in claim 9, further comprising the step of adjusting the speed of the foil web based on the compared scatter pattern value.

11. A process as claimed in claim 9, wherein the temperature of said neutral temperature zone is adjusted to obtain isotropy conditions with uniform orientation conditions in said molecules or said molecular chains of said foil in a preferred direction.

* * * * *

UNITED STATES PATENT AND TRADEMARK OFFICE
CERTIFICATE OF CORRECTION

PATENT NO. : 4,684,487
DATED : Aug. 4, 1987
INVENTOR(S) : GAWRISCH

It is certified that error appears in the above-identified patent and that said Letters Patent is hereby corrected as shown below:

IN THE CLAIMS:

Claim 7, Column 10, line 14, delete "23" and insert instead -- 1 --.

Signed and Sealed this

Twenty-ninth Day of December, 1987

Attest:

DONALD J. QUIGG

*Attesting Officer*  *Commissioner of Patents and Trademarks*